(12) United States Patent
Wingo

(10) Patent No.: US 6,491,256 B1
(45) Date of Patent: Dec. 10, 2002

(54) TRANSPORTATION OF UNQUALIFIED SPACECRAFT OR COMPONENT TO SPACE

(76) Inventor: Dennis Ray Wingo, 1002 Longwood Dr. SE., Huntsville, AL (US) 35801

( * ) Notice: Subject to any disclaimer, the term of this patent is extended or adjusted under 35 U.S.C. 154(b) by 0 days.

(21) Appl. No.: 09/401,760

(22) Filed: Sep. 23, 1999

(51) Int. Cl.$^7$ .................................................. B64G 1/22
(52) U.S. Cl. ................................ 244/158 R; 244/118.1
(58) Field of Search ............................ 244/158 R, 159, 244/160, 161, 162; 220/1.5, 592; 206/386, 521, 591

(56) References Cited

U.S. PATENT DOCUMENTS

| | | | |
|---|---|---|---|
| 3,639,809 A | * 2/1972 | Phlieger, Jr. ................. | 220/5 R |
| 3,814,350 A | * 6/1974 | Fletcher et al. .......... | 244/158 R |
| 4,854,526 A | * 8/1989 | Rochefort ................ | 244/158 R |
| 5,271,582 A | 12/1993 | Perkins et al. | |
| 5,743,492 A | * 4/1998 | Chan et al. .............. | 244/158 R |
| 5,806,799 A | * 9/1998 | Louge ..................... | 244/158 R |
| 5,961,078 A | * 10/1999 | Edberg et al. .......... | 244/158 R |
| 5,979,833 A | * 11/1999 | Eller et al. ............... | 244/158 R |
| 6,059,234 A | * 5/2000 | Mueller et al. .......... | 244/158 R |
| 6,237,795 B1 | * 5/2001 | Buckley et al. .............. | 220/1.5 |

OTHER PUBLICATIONS

NASA Std 5003; Oct. 7, 1996.

* cited by examiner

Primary Examiner—Galen L. Barefoot
(74) Attorney, Agent, or Firm—Lanier Ford Shaver & Payne P.C.; Gerald M. Walsh

(57) ABSTRACT

Transport and in-space assembly of spacecraft from not-qualified-for-launch, low cost parts/modules. Any number of spacecraft or parts thereof are built inexpensively for space usage when they are transported in a manner that does not subject them to stresses of the launch environment. Such spacecraft/parts are transported whole, or in component pieces, in protective containment, i.e., qualified containers which meet all of the applicable safety and performance requirements for containers launched into space. These whole or component pieces of spacecraft may then be tested and deployed and/or assembled and deployed by either robot or human activity. The spacecraft, when at times modular, are assembled so as to form larger structures in space. This piecewise method of construction provides a significant increase in cost-effectiveness concerning both radical spacecraft design and spacecraft-to-launch vehicle qualification processes.

14 Claims, 3 Drawing Sheets

Maximum Flight Spacecraft Interface Shock Environment-6019 and 6915 Payload Attach Fitting

| Axis | Frequency (Hz) | Acceptance test levels | Sweep rate |
|---|---|---|---|
| Thrust | 5 to 6.2<br>6.2 to 100 | 1.27 cm (0.5 inch) double amplitude<br>1.0 g (zero to peak) | 4 octaves/minute |
| Lateral | 5 to 100 | 0.7 g (zero to peak) | 4 octaves/minute |

Table 4-13. Sinusiodal Vibration Qualification Test Levels

| Axis | Frequency (Hz) | Acceptance test levels | Sweep rate |
|---|---|---|---|
| Thrust | 5 to 7.4<br>7.4 to 100 | 1.27 cm (0.5 inch) double amplitude<br>1.4 g (zero to peak) | 2 octaves/minute |
| Lateral | 5 to 6.2<br>6.2 to 100 | 1.27 cm (0.5 inch) double amplitude<br>1.0 g (zero to peak) | 2 octaves/minute |

Table 4-14. Sinusiodal Vibration Protoflight Test Levels

| Axis | Frequency (Hz) | Acceptance test levels | Sweep rate |
|---|---|---|---|
| Thrust | 5 to 7.4<br>7.4 to 100 | 1.27 cm (0.5 inch) double amplitude<br>1.4 g (zero to peak) | 4 octaves/minute |
| Lateral | 5 to 6.2<br>6.2 to 100 | 1.27 cm (0.5 inch) double amplitude<br>1.0 g (zero to peak) | 4 octaves/minute |

Fig. 2

TRANSPORTATION OF UNQUALIFIED SPACECRAFT OR COMPONENT TO SPACE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates, in general, to spacecraft and their assembly, transport to and placement in exospheric environment. In particular, it involves a radical departure from the current state of the art in that it forgoes the modern practice of designing and building orbital and interplanetary craft, regardless of their required degree of structural strength, to the standards necessary to survive the rigors of rocket launch shocks, vibrations and g-forces. This departure from the current practice consists in special containerization of spacecraft components or modules, conventional rocket transport of the components/modules to an orbital assembly locus, and final in-orbit assembly and deployment by human or robotic effort.

2. Description of Related Art

The designer of spacecraft, particularly those bearing delicate devices such as scientific instrumentation, has been confronted with serious difficulties in designing mechanical and electrical articles/ devices that must survive a severe transport environment of shock, vibration, acoustical coupling, decompression and thermal variation. Today, spacecraft are flown on launch vehicles of the United States Space Transportation System (STS) as well as vehicles from China, Russia, Israel and the European Union. Common to all of these vehicles, under the best of circumstances, is the requirement that any spacecraft, or other payload that flies on them, be designed to survive acceleration, vibration, and acoustic forces that are several times those they will experience in space. These design requirements literally drive the cost and scheduling of a spacecraft mission and thereby define a problem well known in the field, that of acquiring spacecraft rocket launch-survivability at high cost and heavier than (technically) necessary construction.

U.S. Pat. No. 5,271,582 shows a spacecraft constructed of multiple payloads (modules) and which is rocket-launched and placed in earth orbit as a unitary article. To place this craft in space by a conventional launch vehicle, it must be constructed to standards such as NASA STD 5003, which will ensure its survival in the launch and space environments. Such standards, when met by a system or component/ sub-system, including special containers or packaging, acquire a launch/ rocket-transport/space qualification, i.e., are certified and termed "qualified".

In the present practice, whole satellites/spacecraft must be qualified for acceptance aboard, and launched by conventional launch vehicles. The aforesaid requirement for qualification, therefore, militates the high cost design and construction of all satellites/spacecraft.

BRIEF SUMMARY OF THE INVENTION

The deficiencies and limitations of prior art and practice, in the launching and space posturing of space systems, craft or satellites (hereinafter, "craft"), are overcome by my method. First, a desired craft is designed as an ensemble of modular sub-systems/ components/ devices that may be readily assembled by human and/or robot effort, cognizant of the fact that the modules need not be fabricated to "qualified" standards, but only to those necessary to perform their intended functions, in their intended environments. For example (and as will be further delineated hereafter), craft are in fabrication that utilize this modular concept and whose structures are made from sheet or formed aluminum rather than costly machined aluminum and expensive composites. Their average structural design costs plunge as much as 90%; so also may the costs associated with deployable booms, antennas, or other appendages. A concurrent advantage of using the instant transporting method is elimination of the second and third most common failures plaguing spacecraft today-separation failure and malfunction in deploying appendages in space. Another asset is the ability to test spacecraft and replace failing modules/ components before final deployment.

In preparation for launch, an assembled craft, or an assemblage of components (module) of a craft is placed within a container that is itself qualified, without the (contained) craft/assemblage being so qualified. Thus, the craft or assemblages that can be put together (be built into a craft) by robot or human methods are materially less expensive than those built in current practice.

The individual pieces, parts, system or subsystem parts that are carried aloft in the manner described are assembled, say as modular parts, into an operating spacecraft that can be deployed into orbit or remain a fixed part of the space station. The spacecraft will be made of fit-together subassemblies (components or modules) that can be assembled into an operating satellite, or used to construct larger space vehicles. The spacecraft will have, but are not limited to, batteries, solar arrays, attitude control devices, structural and propulsion elements, and science, engineering, or commercial payloads.

After launch and space positioning are accomplished, a craft is built in space or in orbiting facilities best exemplified by the U.S. Space Shuttle or the International Space Station (ISS). The craft would then be deployed from the orbiting facility, to proceed on the mission for which it was designed.

BRIEF DESCRIPTION OF THE SEVERAL VIEWS OF THE DRAWINGS

Of the Drawings:

FIG. 2 is a table showing the sinusoidal vibration test and qualification criteria for the Delta II™ launch vehicle.

DETAILED DESCRIPTION OF THE INVENTION

Over the years a set of design requirements have been generated by the various companies and government agencies that determine the adequate strength of a structure, the absence of coupled acoustics and vibration modes, as well as thermal and space environments. The creator of space systems is confronted with serious difficulties when designing mechanical and electrical devices that must meet these requirements to ensure survival of the systems in launch and space environments.

Figure 1:
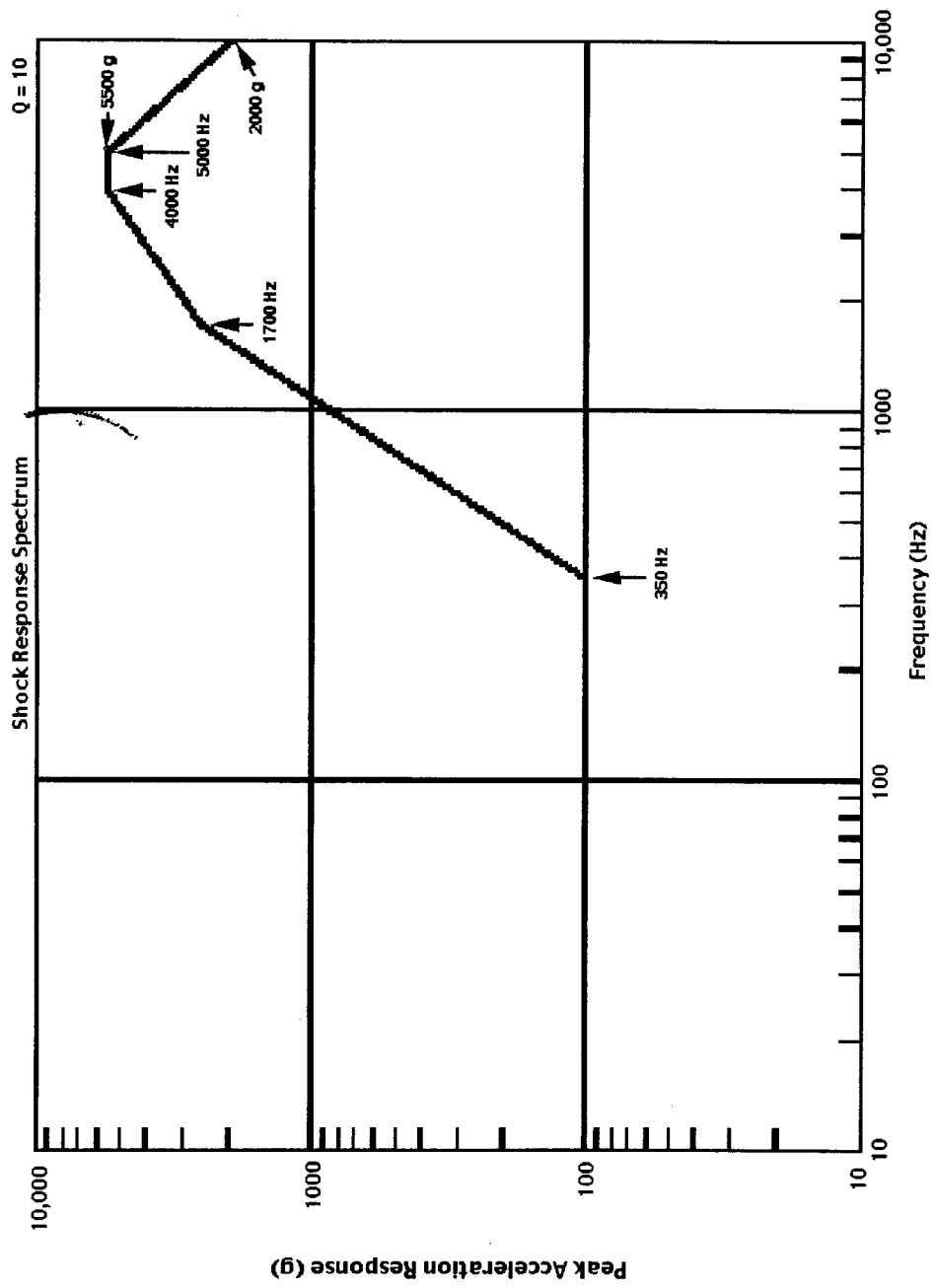
FIG. 1 depicts, graphically, the shock environment of a craft mounted on the Boeing™ Payload Attach fitting.
Figure 3:
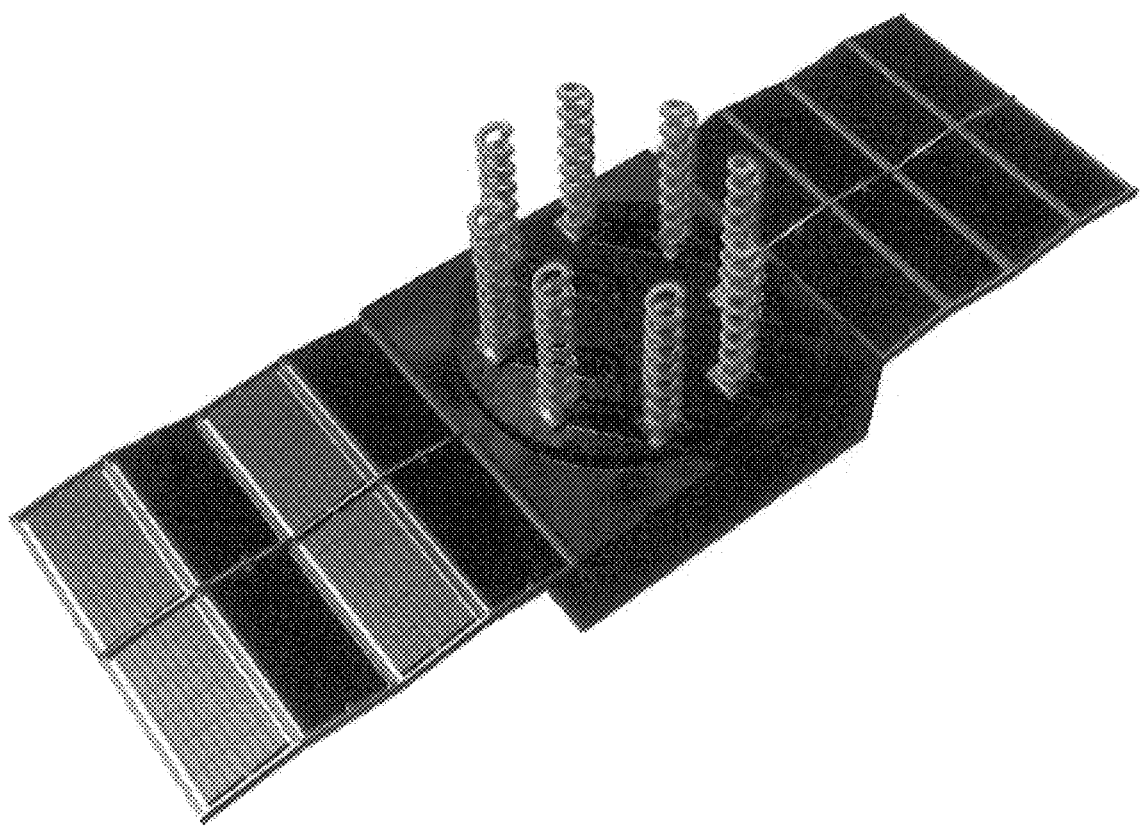
FIG. 3 is an illustration of the SkySat™ spacecraft preliminary design.

The primary thrust of my method is to alter the conventional practice of building high cost, high strength spacecraft, satellites and associated components or equipment to a rigorous set of standards in order simply to survive the launch-to-orbit ordeal. Notably, my invention recognizes the existence of containerization that is specifically qualified to the aforementioned set of standards for selected launch vehicles. A new generation of spacecraft is characterized, for example, by stamped aluminum components rather than the conventional machined or chemically milled parts. One such spacecraft is depicted in FIG. 3. This generation of craft is made using modular techniques, to be fit together subsequent to achieving space positioning. The method involves pre-launch packaging of a craft or modules into qualified containers that provide complete insulation from the launch hazards such as are illustrated in FIG. 1. Thereafter, the prepackaged or containerized craft/modules are secured in the launch vehicle for which the containers are qualified (see FIG. 2) and placed into space or on an orbiting assembly facility for final assembly and/or mission deployment.

Referring briefly to the qualified container, means for securing and protecting therein any unqualified material is accomplished by the use of a qualified material, akin to foam, that will protect the pieces and provide the shock absorption capability to meet other safety requirements related to containment of internal parts. These parts can then be assembled on board the orbital or any other space- based facility to realize a craft or system that would not, in the assembled form qualify for, or be launched in the manner of current practice.

Referring now to FIG. 1, there is graphically portrayed, the shock environment of a spacecraft mounted on the Boeing™ Payload Attach fitting. A brief survey of the arguments, peak acceleration response vs. frequency, provides the reader with an idea of the problem facing a designer who must envisage this environment. More to the point, FIG. 2 illustrates a Qualification Criterion for a particular launch vehicle, the famous Delta II™. Again, one is given the understanding of the overall problem that can, to great extent, be avoided with my transport method. Relative to the figure, any payload that flies on any vehicle such as this must pass a stringent set of requirements regarding the ability of the spacecraft to survive the tremendous acceleration and other forces imposed by the lofting of the spacecraft from the ground to space. For almost every existing vehicle the g-forces are a factor of ten higher than when resting on the ground. Also, the engines of a launch vehicle vibrate a spacecraft at particular frequencies, mostly below 100 Hz, in such a way that could destroy the satellite or at least make it non-operable on orbit. Added to this is the acoustic environment generated from the roaring of the air flowing past the faring during supersonic flight through the lower atmosphere.

Final to this disclosure, I present, in FIG. 3, an illustration of the SkySat™ satellite being produced by SkyCorp™, Inc. of Huntsville, Ala. This design is a radical departure from conventional space systems and is illustrative of the type of craft or components that are to be transported to space by the instant method:

EXAMPLE

The SkySat™ System Design

The SkySat™ system design follows traditional methods in combining all of the normal systems of a spacecraft. However, with the greatly reduced requirements on the structure and appendages, these spacecraft weight up to 70% less than others of their type. This design is given to be representative of a typical spacecraft built by this method.

The SkySat Satellites are flattened cubes with dimensions of 76.2 cm×76.2 cm×25.4 cm.

A weight breakdown is as follows:

TABLE 1

SkySat Preliminary Weight Budget

| SkySat Satellite Mass Budget | Kilograms |
| --- | --- |
| Spacecraft Structure | 2 |
| MET Thruster | 4 |
| Battery | 8 |
| Computer | 2 |
| Communications | 2 |
| Solar Arrays & Power System | 2 |
| MET Water Container | 2 |
| Antennas | 1 |
| GN&C (Magnetorquers) | 2 |
| Total Dry Mass | 25 |
| Water (¼ more due to weight) | 20 |
| Total Wet Mass (4.6 km/sec dv) | 47 |

With this new paradigm, the structure of the satellites will be lightweight stamped aluminum. Preliminary estimates from vendors show reduced costs, from the original $20,000 for each structure, to $300 dollars per structure. The other components can also be of low cost commercial design. Electronic components still have to be designed for proper thermal operation and so this design, analysis, and verification step cannot be shortcut. FIG. 3 shows a preliminary outline of the design of the SkySat™ bus.

The power system for the spacecraft is designed to give 500 watts peak power from triple junction amorphous silicon solar cells. These are extremely lightweight with a power to weight ratio of one kilowatt per kilogram. These cells are currently flying as a test on the Russian Space Station MIR. They can be pre-positioned inside the ISS or Space Shuttle to allow the total power system to be tested before satellite deployment. The batteries are advanced chemistry nickel metal hydride cells that have been flown before on the SEDSAT satellite. The power system for the satellites will be of the distributed architecture type with a single 28-volt bus, which will be regulated in each subsystem by individual DC/DC converters. This gives maximum efficiency along with isolation of each subsystem from the system bus. Latching shorts will be limited to the affected subsystem. Each converter has a disconnecting circuit that will automatically remove power from the affected subsystem until the short is removed or if permanent it is isolated from the rest of the spacecraft.

The computer onboard the satellite is the JPL "spacecube" design, licensed to the corporation. This is a 9×9×15 cm stack that contains twelve processors tied together electrically via the PCI bus architecture. Each processor in the stack is an Analog Devices™ SHARC DSP that will implement in each system a software radio.

Having set forth my invention, and exemplified a currently in-construction craft that will implement its virtue, I commend it to the field for practice in the spirit inculcated herein, limited only by the appended claims.

What is claimed is:

1. A method of transporting a launch unqualified spacecraft into outer space, said method comprising the steps of:

packaging a launch unqualified spacecraft within a launch qualified container;

positioning the launch qualified container within or on a launch vehicle;

launching the launch vehicle into outer space;

unpackaging the launch unqualified spacecraft from the launch qualified container; and deploying the launch unqualified spacecraft into an orbit within outer space.

2. The method of claim 1 wherein said launch unqualified spacecraft includes a plurality of launch unqualified components and wherein said launch qualified container comprises a plurality of launch qualified containers, said packaging step comprising the step of packing the plurality of launch unqualified components in more than one of the plurality of launch qualified containers.

3. The method of claim 2 wherein said unpackaging step comprises the step of removing the plurality of launch unqualified components from the more than one of the plurality of launch qualified containers, and further comprises the step of assembling the plurality of launch unqualified components within outer space to create a fully operational launch unqualified spacecraft.

4. A method of transporting a launch unqualified spacecraft into outer space, said method comprising the steps of:

positioning a plurality of launch unqualified components of a spacecraft within more than one launch qualified container;

securing the more than one launch qualified containers within or on a launch vehicle;

launching the launch vehicle into space;

removing the plurality of launch unqualified components from the more than one launch qualified containers once the launch vehicle reaches outer space;

assembling the plurality of launch unqualified components within outer space to form a fully operational launch unqualified spacecraft; and deploying the fully operational launch unqualified spacecraft into orbit.

5. The method of claim 4 further comprising the step of testing the functionality of the launch unqualified spacecraft after said removing step and before said deploying step.

6. The method of claim 4 wherein said positioning step comprises the step of securing and protecting the plurality of launch unqualified components within a qualified material within each of the more than one launch qualified containers.

7. The method of claim 4 further comprising the step of transporting the more than one launch qualified containers to a space-based facility prior to said removing step.

8. The method of claim 7 wherein said space-based facility comprises a space shuttle and wherein said assembling step comprises the step of manually connecting the plurality of launch unqualified components via human intervention.

9. The method of claim 7 wherein said space-based facility comprises a space shuttle and wherein said assembling step comprises the step of manually connecting the plurality of launch unqualified components via robotic intervention.

10. The method of claim 7 wherein said space-based facility comprises a space station and wherein said assembling step comprises the step of manually connecting the plurality of launch unqualified components via human intervention.

11. The method of claim 7 wherein said space-based facility comprises a space station and wherein said assembling step comprises the step of manually connecting the plurality of launch unqualified components via robotic intervention.

12. An apparatus for transporting a launch unqualified craft into space, said apparatus comprising;

a container constructed and arranged to house a spacecraft; and a qualified packaging material positioned within said container and cooperating with said container to absorb forces which would otherwise be incurred by the spacecraft during a launch such that the unqualified spacecraft, when positioned within said qualified packaging material, arrives in outer space fully functional once the spacecraft is removed from said container and deployed in space.

13. The apparatus of claim 12 wherein said qualified packaging material comprises a material akin to foam.

14. The apparatus of claim 12 wherein said qualified packaging material is capable of protecting a spacecraft packaged therein from vibration frequencies below 100 Hz.

* * * * *